United States Patent [19]

Zellmer

[11] Patent Number: 5,025,364

[45] Date of Patent: Jun. 18, 1991

[54] MICROPROCESSOR EMULATION SYSTEM WITH MEMORY MAPPING USING VARIABLE DEFINITION AND ADDRESSING OF MEMORY SPACE

[75] Inventor: Joel A. Zellmer, Colorado Springs, Colo.

[73] Assignee: Hewlett-Packard Company, Palo Alto, Calif.

[21] Appl. No.: 67,987

[22] Filed: Jun. 29, 1987

[51] Int. Cl.⁵ .................. G06F 9/355; G06F 9/455; G06F 12/02; G06F 7/02

[52] U.S. Cl. .................. 364/200; 364/232.3; 364/238.4; 364/246.3; 364/255.2; 364/927.81; 364/927.97; 364/955.3; 364/966.4; 364/259.2; 364/259.7; 364/259.1; 364/252.5; 364/232.8; 364/958.2; 364/947.1; 364/947.2; 364/947.4

[58] Field of Search ... 364/200 MS File, 900 MS File

[56] References Cited

U.S. PATENT DOCUMENTS

| | | | |
|---|---|---|---|
| 4,104,718 | 8/1978 | Poublan | 364/200 |
| 4,155,199 | 5/1979 | De Ward et al. | 364/200 |
| 4,325,120 | 4/1982 | Colley et al. | 364/200 |
| 4,354,225 | 10/1982 | Frieder et al. | 364/200 |
| 4,453,211 | 6/1984 | Askinazi et al. | 364/200 |
| 4,514,803 | 4/1985 | Agnew et al. | 364/200 |
| 4,514,805 | 4/1985 | McDonough et al. | 364/200 |
| 4,516,199 | 5/1985 | Frieder et al. | 364/200 |
| 4,527,237 | 7/1985 | Frieder et al. | 364/200 |
| 4,674,089 | 6/1987 | Poret et al. | 364/200 |
| 4,720,778 | 1/1988 | Hall | 364/200 |
| 4,796,258 | 1/1989 | Boyce et al. | 371/16 |

Primary Examiner—Archie E. Williams, Jr.
Assistant Examiner—William M. Treat
Attorney, Agent, or Firm—Karl E. Bring

[57] ABSTRACT

A memory mapper for an emulation system suitable for a microprocessor-based system for any size microprocessor is disclosed which uses function code comparators, range comparators, and offset values for individual mapping definitions, thereby providing faster mapping of emulation memory with higher resolution and flexibility in making changes. A single mapper cell is used for implementing each separate mapping definition. The function code comparator for the mapper cell defines the type of memory, the range comparator defines the section of memory covered by the mapper definition, and a translator is used to translate the original address to a translated address by adding an offset to the original address. Original addresses which do not match any mapper cell definitions are mapped according to a default definition.

3 Claims, 5 Drawing Sheets

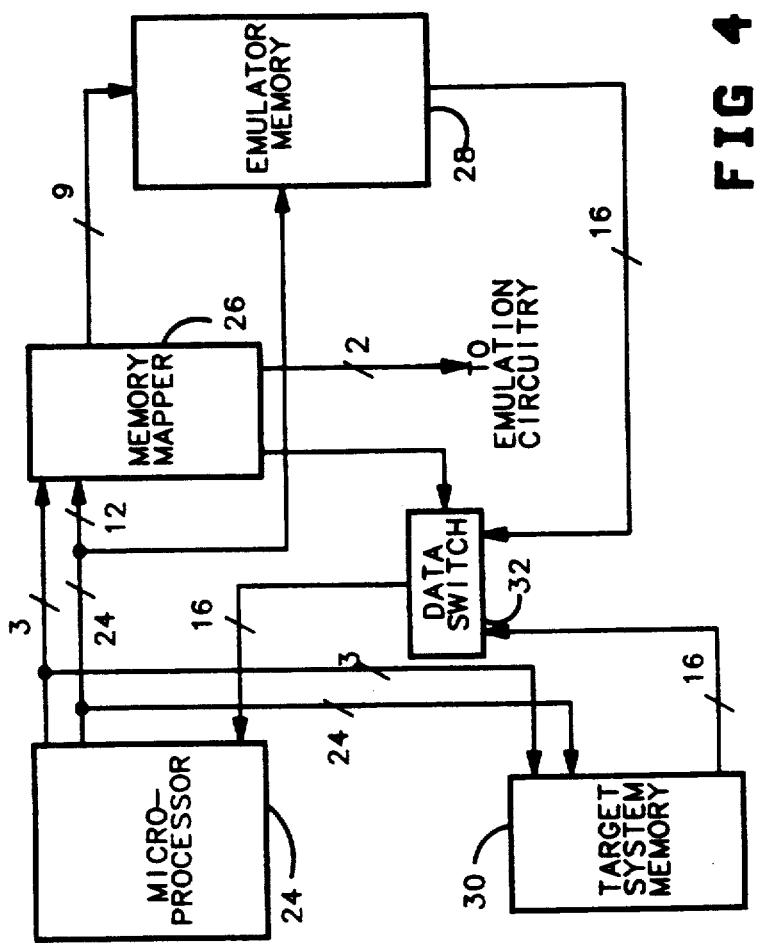

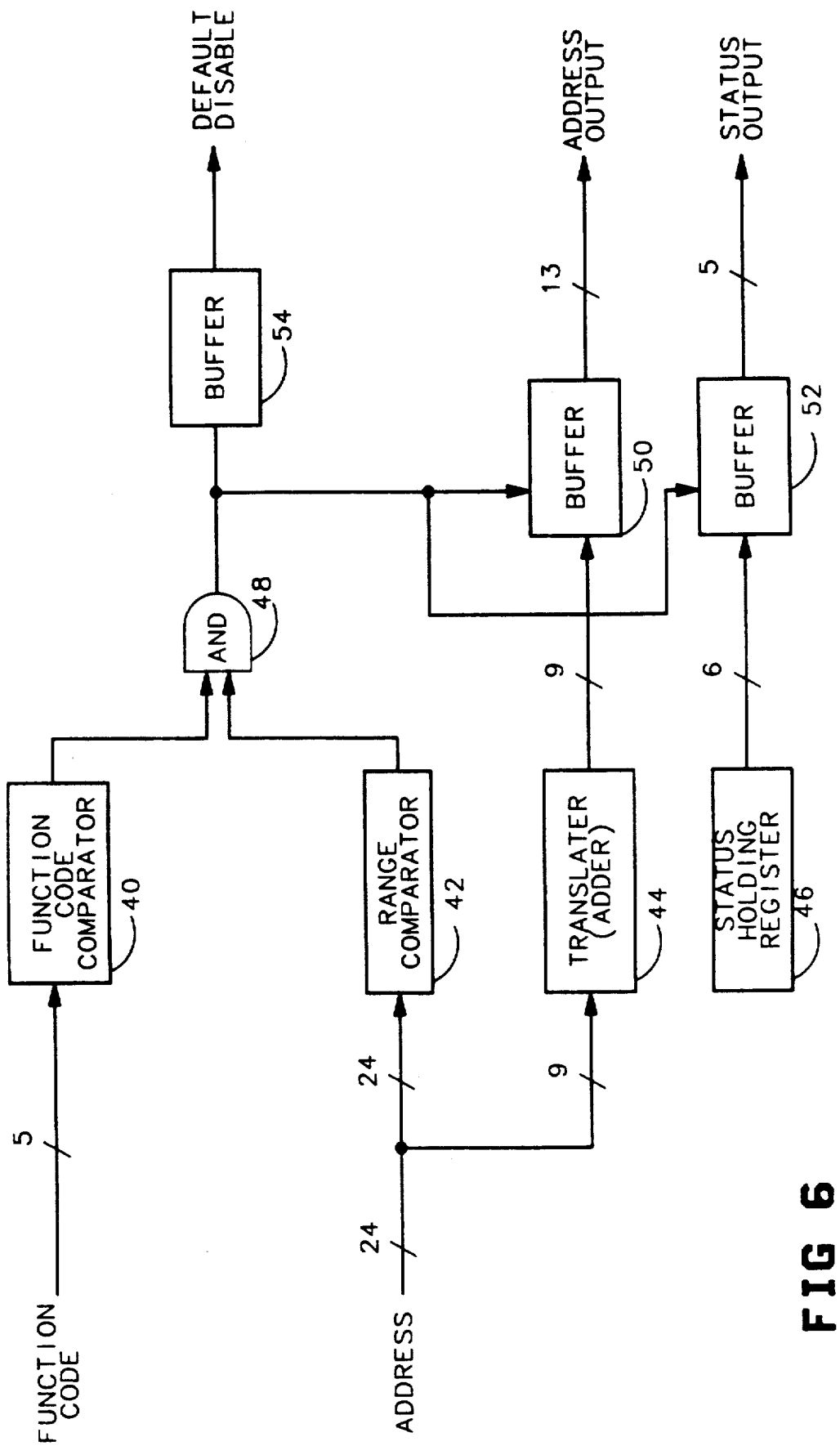

MICROPROCESSOR EMULATION SYSTEM WITH MEMORY MAPPING USING VARIABLE DEFINITION AND ADDRESSING OF MEMORY SPACE

BACKGROUND OF THE INVENTION

This invention relates to emulation systems (emulators) used for developing microprocessor-based systems, and specifically to techniques and hardware for mapping memory between emulators and the microprocessor systems under development (target systems).

Emulators aid the development of microprocessor-based systems by providing means for designers to load and run software before any hardware is built. The emulator may substitute for part or all of the target system. As the development approaches completion, functions performed by the emulator are gradually transferred to the target system. During the development, the emulator provides additional microprocessor controls not usually available which are useful for troubleshooting software problems, including: single stepping, break points for certain memory addresses, break points on improper memory accesses, displaying and modifying internal registers, etc.

Emulators may be connected to the target system at any point in the system's development. FIG. 1 is a block diagram of a generic microprocessor-based system, having microprocessor 10, memory 12, and input/output device 14. FIG. 2 is a block diagram of an emulation system, having emulator 18, host computer 20, and user terminal 22. FIG. 3 is a block diagram of an emulator connected to a microprocessor-based system. The emulator is plugged into the microprocessor socket 16 in the target system in place of microprocessor 10 shown in FIG. 1, and is supported by host computer 20. The emulator provides the microprocessor functions and some of the memory for the system, since the user may not have any or all the target system memory functioning. Another advantage of the emulator is that the user may define the proposed Read Only Memory (ROM) memory in the emulator, where it is easily changed, in contrast with the difficulty of changing actual ROM memory in a target system.

Memory mapping is used to define blocks of memory, for example, Random Access Memory (RAM), ROM, guarded or not guarded (accessible during normal run conditions), wait states, etc.; apportion the proposed target system memory by these blocks between the actual available target system memory, if any, and the emulator memory; and control the memory access during actual emulation such that the appropriate memory block, in either target system or emulator memory, is accessed. It is desirable to use blocks of a small size, for example, 256 locations of byte-sized memory (256 bytes), to enable efficient use of memory. If the block size is large, for example, 65,536 bytes, then the user may waste a large amount of memory by dedicating one block to a function which requires only a few hundred bytes. Small block size also enables the user to separate particular error-prone memory blocks from memory-mapped input/output space in the target system which cannot be moved to emulation memory. Since emulation memory and available target system memory are limited in comparison to proposed target system memory, memory space is at a premium during this phase of development of the microprocessor-based system, and consequently small block size is necessary for efficient memory mapping. Additional criteria necessary for efficient memory mapping are the ability to map to any location in the proposed target system memory, and maintaining a high speed of memory access, comparable to the speed of the proposed target system memory.

Target systems access the memory via the memory mapper as shown in FIG. 4. Whether the memory location accessed is actually located in the target system or the emulator is ideally transparent to the target system. One example of a typical prior art memory mapper for a target system using a 24-bit microprocessor, such as the Motorola 68000 microprocessor, encompasses 24 address lines from a microprocessor 24 and an additional 3 function codes for a user memory partition, used for example, to separate the operating system, the user program, and the user data from each other. FIG. 4 shows the connections for the address lines, the data lines, the function code lines, and the status lines. Of the 24 address lines and 3 function code lines from microprocessor 24, the 12 lowest order address lines are connected directly to emulation memory 28, thus defining the mapping block size as 4096 bytes. The upper 12 address lines and the 3 function code lines are connected to memory mapper 26, which determines the user-assigned location for the memory address. The 24 address lines and 3 function code lines also are connected to target system memory 30.

The status lines include a line for target or emulation memory, a line for ROM or RAM, and a line for guarded or not guarded memory access. The target/emulation memory line (control line) connects mapper 26 to switch 32. Mapper 26 determines the actual location of the address, whether in target system memory 30 or emulator memory 28, and a control signal is sent to data switch 32. If mapper 26 determines the actual location of the memory address is in emulator memory 28, the mapper 26 generates the correct higher order address, which is combined with the lower 12 address lines from the microprocessor, and sent to emulator memory 28, which then generates a data output. Target memory 30 also has generated a data output in response to the address on the 24 address lines and the 3 function codes. One of the memories will have the requested data. A control signal from mapper 26 is sent on the control line to switch 32, which connects the correct data lines to microprocessor 24. The entire response of the combined system is ideally equivalent to the completed target system response.

Since the emulation memory is usually much smaller than the addressable memory of a microprocessor, the memory mapper reduces the number of address lines connected to the microprocessor to the number of address lines connected to the emulation memory. For the example above, the size of the emulator memory was chosen to be 2,097,152 bytes. Since the addressable memory for a Motorola 68000 is 16,777,216 bytes, and the 3 function code lines expand this to 134,217,728 bytes, consequently this requires a mapping of memory into 1/64 the available space. The 12 address lines and 3 function code lines entering the mapper 26 become 9 address lines exiting.

FIG. 5 is a block diagram of a prior art memory mapper suitable for mapping 15 memory mapper address lines into 9 emulator memory address lines. This solution translates each address directly into the actual address through the use of 4K byte static RAMs 33. Prior art emulators usually either ignored the function codes or else dealt with the function codes using separate circuitry 34. This leaves only 12 address lines to be mapped. One RAM is required for each emulator memory address bit and for each status bit, consequently 12 RAMs are required for this particular solution. Each RAM uses all the address inputs for the memory mapper. Each address RAM outputs one bit of the emulator memory address. Each status RAM outputs one status condition of the memory location. The address RAM outputs are connected to the emulator memory and the status RAM outputs are connected to the data switch 32 shown in FIG. 4 and other emulator circuitry. This solution is successful if a commercially available RAM exists which has an addressable memory greater than the effective microprocessor addressable memory for the mapper (as defined by both address and function code lines entering the mapper).

When this solution is attempted for a microprocessor having a 32 bit address bus width, it fails because the required RAMs are not currently available. An address bus width of 32 bits plus 5 bits for function codes is an effective width of 37 address lines. Using the same block size as the prior art example above but with 37 address lines, results as follows: 37 total address lines less 12 unmapped lines (block size) results in 25 address lines to the mapper 26. Twenty-five address lines to the mapper implies that the RAMs used would have 25 address lines and therefore be a 33,554,432 byte (33.6 Megabyte) static RAM, which is probably many years away. This solution could be used with currently available 65,536-byte static RAMs for mapping 16 of the address lines, but the remaining 21 address lines would connect directly to the emulation memory, causing the block size to increase to 2,097,152 bytes, which would allow only one definition for the example of 2,097,152 bytes of emulator memory.

SUMMARY OF THE INVENTION

In accordance with the illustrated preferred embodiment of the present invention, a memory mapper defines, maps, and controls all access to all addressable memory for a microprocessor having any size address bus with high resolution at high speeds by using a set of memory-defining hardware (mapper cell) for each memory definition, each mapper cell receiving all address inputs and all function code inputs with all address outputs wire-ORed together and all control outputs wire-ORed together, each mapper cell having: a function code comparator to match the type of memory, a range comparator to match the address within the type of memory, and a translator for adding an offset value to each address for determining which block of emulator memory is accessed.

The inputs and outputs for the memory mapper are in general similar to the prior art solution described above. For a microprocessor with a 32 bit address bus and 5 function codes, the function of the mapper would be as follows. Once the mapper has been properly initialized by the user, the lowest 8 bits of the address pass to the emulator memory untranslated, resulting in 256 byte resolution, and improved efficiency. As shown in FIG. 6, the function code comparator 40 for each mapper cell tests the function codes lines to determine if there is a match between the function codes and the user-defined reference data. The range comparator 42 for each mapper cell tests the remaining address lines for a match between the address and the user-defined range. The smallest range is one block of memory, and the largest may be the entire memory space. Only one mapper cell will find a match for both comparators 40 and 42. If a match occurs, an offset previously determined by the location of the user-defined range in the emulation memory is added to the input address lines for the mapper and the result becomes the address output for the memory-defining hardware set. All address outputs for the mapper cells are wire-ORed together, producing the upper order address bits for the emulator memory. The lower order address bits (within the block) are already mapped directly to the emulator memory. If there is no match, the location is mapped according to the user-defined default definition, which is either target system memory or guarded memory.

The advantages provided by this solution are high resolution, fast response, improved ability to change memory definitions rapidly, and the ability to map over the entire addressable memory of the proposed target system. The prior art solution used a distributed definition for each block of memory among the several RAMs in the memory mapper, with each RAM containing a different bit for the address of the block. The present invention uses a dedicated set of hardware for each definition, which allows the user greater flexibility in the use of the emulator.

BRIEF DESCRIPTION OF THE DRAWINGS

FIG. 1 is a block diagram of a generic microprocessor-based system under development (target system).

FIG. 2 is a block diagram of a emulation system (emulator).

FIG. 3 is a block diagram which shows an emulation system connected to a microprocessor-based system under development.

FIG. 4 is a block diagram of a portion of an emulator and a target system, which shows a microprocessor, a memory mapper, target system memory, emulation memory and some of the connections between these components.

FIG. 6 is a block diagram of a mapper cell according to the preferred embodiment of the present invention.

DETAILED DESCRIPTION OF THE PREFERRED EMBODIMENT

Figure 5:
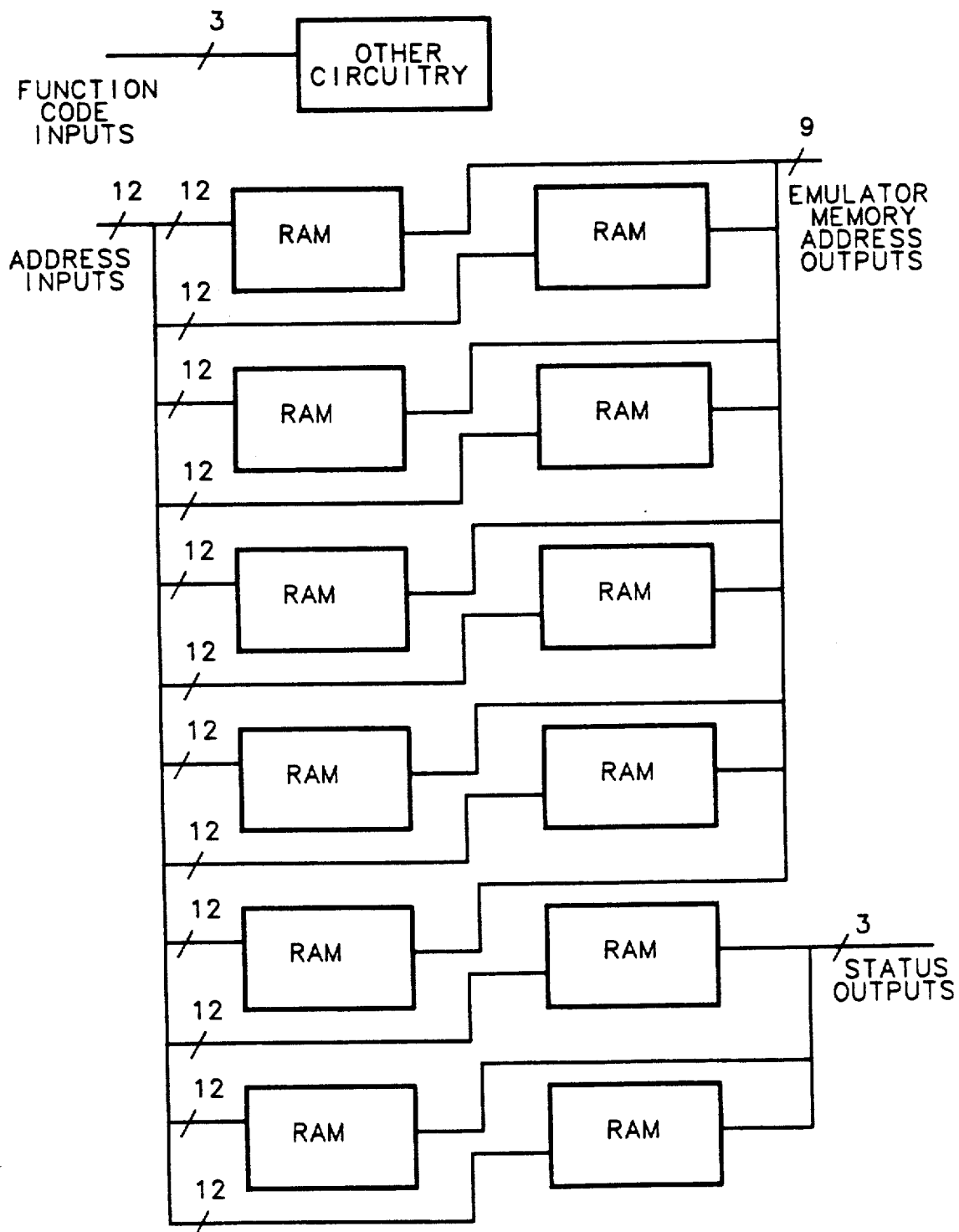
FIG. 5 is a block diagram of a prior art memory mapper.

FIG. 6 shows a mapper cell according to the preferred embodiment of the present invention. Each mapper cell contains the definition for one block of memory. In one embodiment, 4 cells are used to form a mapper chip, and 4 chips are used to form the memory mapper, thereby providing 16 separate definitions for emulation memory and target system memory. A default definition exists for all non-explicitly mapped memory.

The inputs for each mapper cell include the function code lines and the microprocessor address lines. The outputs for each mapper cell include the emulator memory address lines, the memory block status lines, and the default disable line.

Prior to emulation, the user defines some or all of the proposed target system memory as emulation memory or target memory. Memory not defined as either falls under the default definition, which is defined as either target memory or guarded memory. The definition for each block of emulation memory includes function code (1 of 32 levels), range (between 1 and the maximum number of memory blocks, location in emulator memory (offset), and status conditions as to the type of memory, for example, target system memory or emulation memory, ROM or RAM, guarded or not guarded (the emulators breaks on access to guarded memory), number of wait states (some memory is slower than others), data bus width, etc.

The following is one example of a format used in defining a memory map.

The function code comparisons (5 codes for this embodiment, 10 bits for each cell) are defined by 2-bit patterns. The second bit defines whether the comparison should be at the high or low level. Setting this bit high means the comparison will be true when the input is high. The first bit is a masking bit. When this bit is 1, the comparison is always true (masked off).

| Bit number | Function |
| --- | --- |
| 1 | masking bit for FC0 |
| 2 | reference bit for FC0 |
| 3 | masking bit for FC1 |
| 4 | reference bit for FC1 |
| 5 | masking bit for FC2 |
| 6 | reference bit for FC2 |
| 7 | masking bit for FC3 |
| 8 | reference bit for FC3 |
| 9 | masking bit for FC4 |
| 10 | reference bit for FC4 |

The range definitions (48 bits for each cell) represent two 24-bit range limits, an upper limit and a lower limit. If the incoming address is equal to one of these limits, or between them, the range comparison is true. The upper and lower limits are loaded as shown below.

| Bit number | Function |
| --- | --- |
| 1 | compare bit for UPLIM0 |
| 2 | compare bit for UPLIM1 |
| . | |
| . | |
| . | |
| 24 | compare bit for UPLIM23 |
| 25 | compare bit for LOLIM0 |
| 26 | compare bit for LOLIM1 |
| . | |
| . | |
| . | |
| 48 | compare bit for LOLIM23 |

The address offset (13 bits for each cell) used in this example represents a 13-bit number which is added to the input address, to produce the mapped address outputs (13 bits). The offset which is added is held in a holding register as shown.

| Bit number | Function |
| --- | --- |
| 1 | least significant bit of address offset |
| . | |
| . | |

| Bit number | Function |
| --- | --- |
| 13 | most significant bit of address offset |

The status definition (6 bits for each cell) represents a 6-bit number which is sent to the emulator circuitry when a range and function code match is achieved. The status bits include a control bit for switching a data switch for emulation memory or target memory. The bits are defined as shown below.

| Bit number | Function |
| --- | --- |
| 1 | ST0 |
| 2 | ST1 |
| 3 | ST2 |
| 4 | ST3 |
| 5 | ST4 |
| 6 | ST5 |

In one embodiment, each chip is programmed serially by 1 data input line, a clock and clock enable line. The serial channel is daisy chained through the 4 cells on a chip.

The total number of bits required to program the chip for this embodiment is 309, organized as shown below. The bits are numbered starting with the first bit shifted onto the chip.

| Bit number | Function |
| --- | --- |
| 1 | spare bit |
| 2-7 | status, cell #4 |
| 8-13 | status, cell #3 |
| 14-19 | status, cell #2 |
| 20-25 | status, cell #1 |
| 26-38 | offset, cell #4 |
| 39-51 | offset, cell #3 |
| 52-64 | offset, cell #2 |
| 65-77 | offset, cell #1 |
| 78-125 | range limits, cell #4 |
| 126-173 | range limits, cell #3 |
| 174-221 | range limits, cell #2 |
| 222-269 | range limits, cell #1 |
| 270-279 | function code definition, cell #4 |
| 280-289 | function code definition, cell #3 |
| 290-299 | function code definition, cell #2 |
| 300-309 | function code definition, cell #1 |

The function codes define user memory partitions and are evaluated by function code comparator 40, as shown in FIG. 6. If the function codes match the user definition, the output line for comparator 40 is set high. The upper order address bits are evaluated by range comparator 42. If the address bits equal the range limits, or fall between them, the output line for comparator 42 is set high. The outputs for comparators 40 and 42 are connected to AND gate 48. If both the function code and the address match, this cell has the applicable block definition, buffers 50 and 52 are enabled, and buffer 54 is used to disable the default definition. If either the function code and the address do not match, buffer 54 allows the default to remain enabled.

Translator 44 adds the predetermined offset for the block to the lower 13 of the 24 address lines entering the cell. This effectively creates the block address for the memory location. If buffer 50 is enabled, the output for translator 44 is placed on the output lines for buffer 50. If buffer 50 is not enabled, the output is low.

Status register 46 holds the status codes. If buffer 52 is enabled the output of register 46 is placed on the output lines for buffer 52. If buffer 52 is not enabled, the output is low.

Figure 7:
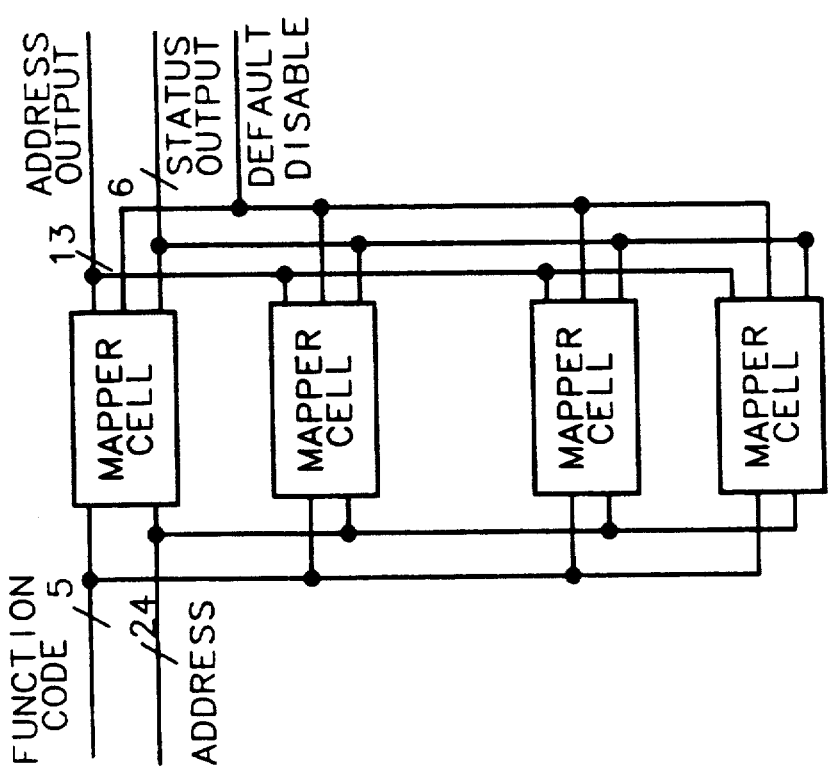
FIG. 7 is a block diagram of a mapper chip according to the preferred embodiment of the present invention.

FIG. 7 shows a mapper chip having 4 mapper cells 55. The output addresses from each buffer 50 shown in FIG. 6 are wire-ORed together in FIG. 7. The default disables from each cell are also wire-ORed together. In the same manner, the outputs from each buffer 52 shown in FIG. 6 are wire-ORed together in FIG. 7. If no cells in the chip have the applicable definition, the address outputs, the default disables, and the status outputs are low. If one cell has the definition, the applicable address will appear on the address outputs, the default disable will be set high, and the applicable status will appear on the status outputs.

Figure 8:
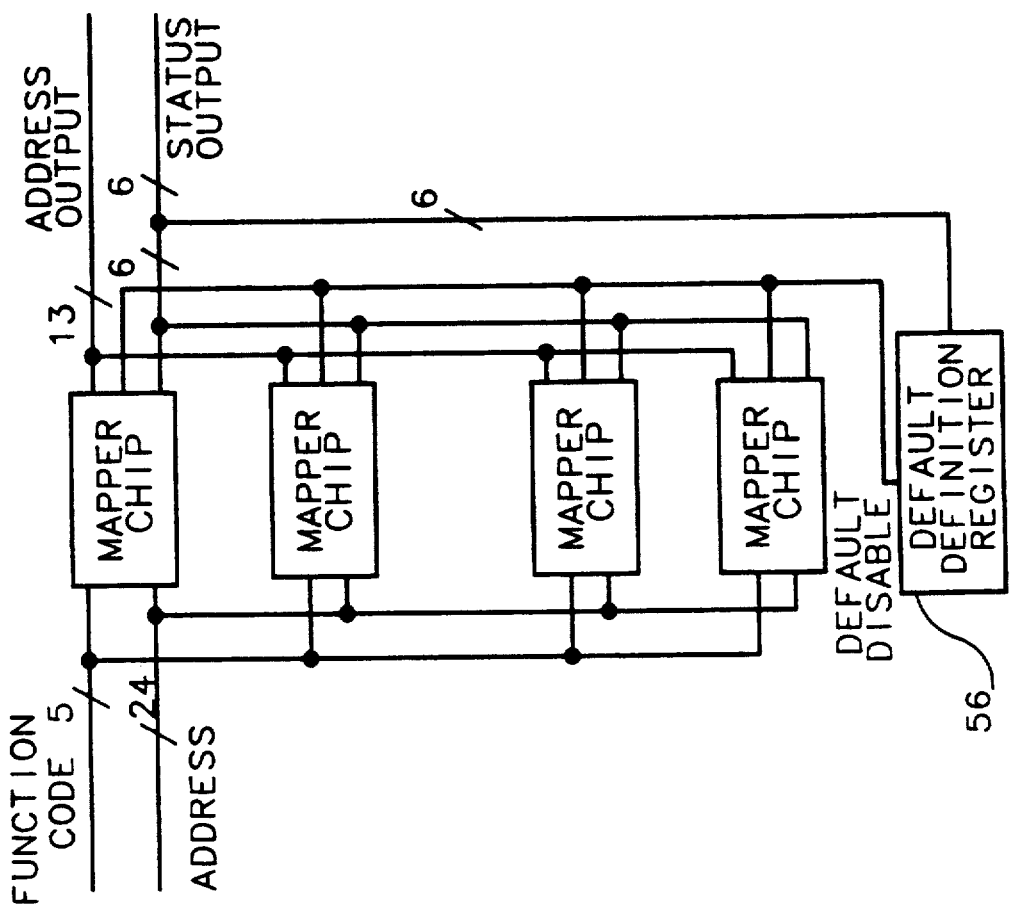
FIG. 8 is a block diagram of a memory mapper according to the preferred embodiment of the present invention.

FIG. 8 shows a memory mapper having 4 mapper chips 34, thereby maintaining a possibility of 16 memory definitions. In the same manner as the mapper chip in FIG. 7, the address outputs, the default disables, and status outputs are wire-ORed together to provide the applicable address and status if the location is mapped to emulator memory. If no cell has the applicable definition, the default disables remains low, and the status conditions held in default definition register 56 are placed on the status lines, effectively mapping the location to the default definition, which is either target system memory or guarded memory.

Figure 9:
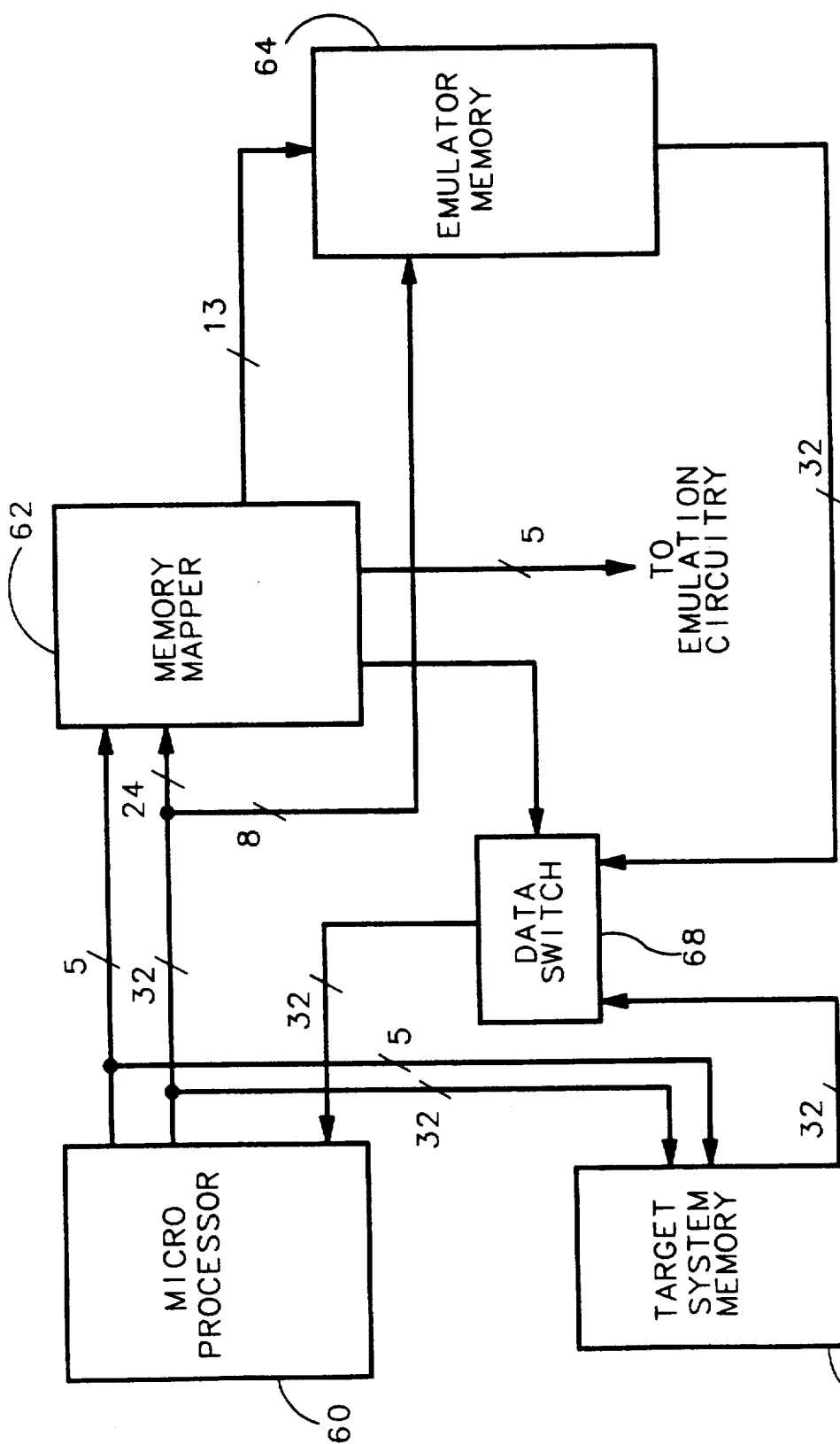
FIG. 9 is a block diagram of a portion of an emulator and a target system, which shows a microprocessor, a memory mapper according to the preferred embodiment of the present invention, target system memory, emulation memory and some of the connections between the components.

The control signal (status signal for target/emulation memory), if high, sets data switch 68 in FIG. 9 to connect emulator memory 64 output to microprocessor 60. If low, switch 68 connects target memory 66 to microprocessor 60. The address output from mapper 62 locates the correct memory block in memory 64 while the lower order address lines from microprocessor 60 which bypassed mapper 62 located the correct address within the memory block. In this embodiment, the status outputs from mapper 62 are sent to the emulator circuitry to be used to generate breaks on memory access, etc. The emulator function is similar to the emulator function in FIG. 4.

I claim:

1. Apparatus for defining and mapping memory blocks in an emulation system, comprising:

a plurality of definition means, each having a plurality of address inputs, a plurality of definition inputs, a plurality of address outputs, and a control output, for defining individual blocks of memory, wherein each definition means operates in parallel to all other definition means in the system, wherein the address inputs for each definition means are identical, the address outputs for each definition means are ORed together, the control outputs for each definition means are ORed together, and wherein each definition means comprises:

range comparator means connected to the address inputs, the definition inputs, and the control output, for determining whether the address on the address inputs is outside a range defined by an upper and lower user-defined limit whereby a comparator means result is produced and for signaling the comparator means result on the control output, said range comparator means comprising definition comparator means for determining whether the definition inputs are identical to a user defined definition, translator means connected to the address inputs and the definition inputs, for adding a user-defined offset to the address on the address inputs whereby a translator means result is produced, and buffer means connected to the range comparator means and the translator means and the address output, for placing the translator means result on the address output only when both the range comparator means determines the address is not outside the defined range and the definition comparator means determines the definition inputs are identical to the user-defined definition.

2. Apparatus as in claim 1 wherein the address outputs for each definition means are wire-ORed together and the control outputs for each definition means are wire-ORed together.

3. An emulation system for emulating a user-defined microprocessor-based target system having a target microprocessor for executing the target system, a target memory wherein target system information is stored in relation to target memory address information, and a target input/output port, the system comprising:

emulation support means for receiving user commands, for accessing the target system to determine internal target system values, and for emulating a user-defined microprocessor-based target system;

microprocessor means connected to the emulation support means for controlling the emulation support means in response to received user commands;

emulation memory means connected to the microprocessor means for emulating a target memory defined in the target system; and memory mapper means connected to the emulation support means, the microprocessor means, and the emulation memory means, for receiving the target memory address information, for defining and mapping memory blocks in the emulation memory means in relation to the target memory address information and for storing information in the emulation memory means in relation to the defining and mapping of memory blocks, wherein said memory mapper means comprises:

a plurality of definition means, each having a plurality of address inputs, a plurality of definition inputs, a plurality of address outputs, and a control output, for defining individual blocks of memory, wherein each definition means operates in parallel to all other definition means in the system, wherein the address inputs for each definition means are identical, the address outputs for each definition means are ORed together, the control outputs for each definition means are ORed together, and wherein each definition means comprises:

range comparator means connected to the address inputs, the definition inputs, and the control output, for determining whether the address on the address inputs is outside a range defined by an upper and lower user-defined limit whereby a comparator means result is produced and for signaling the comparator means result on the control output, said range comparator means comprising definition comparator means for determining whether the definition inputs are identical to a user defined definition, translator means connected to the address inputs and the definition inputs, for adding a user-defined offset to the address on the address inputs whereby a translator means result is produced, and buffer means connected to the range comparator means and the translator means and the address output, for placing the translator means result on the address output only when both the range comparator means determines the address is not outside the defined range and the definition comparator means determines the definition inputs are identical to the user-defined definition.

* * * * *